United States Patent
Zhang et al.

(10) Patent No.: US 10,904,814 B2
(45) Date of Patent: Jan. 26, 2021

(54) ELECTRONIC DEVICE AND METHOD FOR WIRELESS COMMUNICATION

(71) Applicant: Sony Corporation, Tokyo (JP)

(72) Inventors: Yuan Zhang, Nanjing (CN); Penshun Lu, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/490,891

(22) PCT Filed: May 4, 2018

(86) PCT No.: PCT/CN2018/085579
§ 371 (c)(1),
(2) Date: Sep. 4, 2019

(87) PCT Pub. No.: WO2018/205885
PCT Pub. Date: Nov. 15, 2018

(65) Prior Publication Data
US 2020/0015139 A1 Jan. 9, 2020

(30) Foreign Application Priority Data
May 9, 2017 (CN) .......................... 2017 1 0322080

(51) Int. Cl.
*H04W 36/36* (2009.01)
*H04W 36/30* (2009.01)
(Continued)

(52) U.S. Cl.
CPC .......... *H04W 36/30* (2013.01); *H04B 17/309* (2015.01); *H04W 36/0085* (2018.08);
(Continued)

(58) Field of Classification Search
CPC ........... H04W 36/30; H04W 36/00837; H04W 36/0085; H04W 36/00; H04W 36/03;
(Continued)

(56) References Cited

U.S. PATENT DOCUMENTS 10,178,594 B1\* 1/2019 Liu .................... H04B 7/15507
10,313,944 B2\* 6/2019 Oyabu .................. H04W 36/18
(Continued)

FOREIGN PATENT DOCUMENTS

| CN | 101150840 A | 3/2008 |
| CN | 101547485 A | 9/2009 |
| CN | 104349402 A | 2/2015 |

OTHER PUBLICATIONS

Oppo: "Discussion on group mobility procedure" 3GPP TSG-RAN2 Meeting #98, R2-1704995, vol. RAN WG2, Hangzhou, China, May 15-19, 2017 (May 5, 2017), XP051263916. (Year: 2017).*

(Continued)

*Primary Examiner* — Khawar Iqbal
(74) *Attorney, Agent, or Firm* — Xsensus, LLP

(57) ABSTRACT

An electronic device comprises a processing circuit configured to: perform a first determination for determining whether a mobile device should switch on a current serving base station, and if it is determined that the mobile device should switch on the current serving base station, acquire a channel measurement result of a wireless communication device connected to the mobile device; and perform second determination for determining whether the mobile device should switch on the current serving base station, and if it is determined that the mobile device should switch on the current serving base station, perform, on the basis of at least the channel measurement result of the wireless communication device, a switch of the wireless communication device from the mobile device serving as the current serving base station of the wireless communication device to a target serving base station.

12 Claims, 12 Drawing Sheets

(51) Int. Cl.
*H04B 17/309* (2015.01)
*H04W 36/00* (2009.01)
*H04W 4/70* (2018.01)

(52) U.S. Cl.
CPC ..... *H04W 36/00837* (2018.08); *H04W 36/03* (2018.08); *H04W 4/70* (2018.02)

(58) Field of Classification Search
CPC ...... H04W 36/08; H04W 4/70; H04B 17/309; H04B 7/15
See application file for complete search history.

(56) References Cited

U.S. PATENT DOCUMENTS

| | | | |
|---|---|---|---|
| 2011/0124330 A1 | 5/2011 | Kojima | |
| 2015/0195757 A1* | 7/2015 | Tietz | H04W 36/0094 455/438 |
| 2016/0021594 A1* | 1/2016 | Yilmaz | H04W 8/005 370/332 |
| 2016/0150452 A1* | 5/2016 | Kitaji | H04W 36/0016 370/315 |
| 2018/0063736 A1* | 3/2018 | Sadeghi | H04W 24/10 |
| 2018/0092022 A1* | 3/2018 | Huang | H04W 36/0077 |
| 2018/0279196 A1* | 9/2018 | Takagi | H04B 7/15528 |
| 2019/0104450 A1* | 4/2019 | Adachi | H04W 36/0072 |
| 2019/0109631 A1* | 4/2019 | Basu Mallick | H04W 52/0229 |
| 2020/0015192 A1* | 1/2020 | Chun | H04W 60/00 |
| 2020/0077253 A1* | 3/2020 | Kim | H04W 76/14 |
| 2020/0120625 A1* | 4/2020 | Park | H04W 4/40 |
| 2020/0128612 A1* | 4/2020 | Tsuda | H04W 76/28 |

OTHER PUBLICATIONS

International Search Report and Written Opinion dated Jul. 27, 2018 for PCT/CN2018/085579 filed on May 4, 2018, 9 pages including English Translation of the International Search Report.

* cited by examiner

ELECTRONIC DEVICE AND METHOD FOR WIRELESS COMMUNICATION

CROSS-REFERENCE TO RELATED APPLICATIONS

This application is based on PCT filing PCT/CN2018/085579, filed May 4, 2018, which claims the priority to Chinese Patent Application No. 201710322080.6, titled "ELECTRONIC DEVICE AND METHOD FOR WIRELESS COMMUNICATION", filed on May 9, 2017 with the China National Intellectual Property Administration, the entire contents of each are incorporated herein by reference.

FIELD OF THE DISCLOSURE

Embodiments of the present disclosure generally relate to the field of wireless communications, in particular to handover of a serving base station in wireless communications, and more particularly to an electronic apparatus and a method for wireless communications.

BACKGROUND OF THE DISCLOSURE

In the mobile communication scenario, handover of the serving base station may occur to both a mobile device providing services such as a mobile base station and a served wireless communication device (e.g. user equipment) due to their mobility. For example, the user equipment is handed over from one mobile base station to another mobile base station or a macro base station, and the mobile base station is handed over from one macro base station to another macro base station. In a current handover scheme, since the user equipment and the mobile base station independently perform handover respectively, the order of the two kinds of handover is uncertain in a case that they occur simultaneously.

SUMMARY OF THE DISCLOSURE

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry which is configured to: perform a first judgment as to whether a mobile device is to perform handover of a current serving base station of the mobile device; acquire, in a case that it is determined in the first judgment that the mobile device is to perform handover of the current serving base station, a channel measurement result of a wireless communication device connected to the mobile device; perform a second judgment as to whether the mobile device is to perform handover of the current serving base station; and in a case that it is determined in the second judgment that the mobile device is to perform handover of the current serving base station, hand over the wireless communication device from the mobile device serving as the current serving base station of the wireless communication device to a destination serving base station at least based on the channel measurement result of the wireless communication device.

According to another aspect of the present disclosure, an electronic apparatus for wireless communications is provided. The electronic apparatus includes processing circuitry which is configured to: perform channel measurement, in response to a channel measurement instruction from a current serving base station of a wireless communication device; and generate a message containing a channel measurement result, to be reported to the current serving base station.

According to another aspect of the present disclosure, a method for wireless communications is provided. The method includes: performing a first judgment as to whether a mobile device is to perform handover of a current serving base station of the mobile device; acquiring, in a case that it is determined in the first judgment that the mobile device is to perform handover of the current serving base station, a channel measurement result of a wireless communication device connected to the mobile device; performing a second judgment as to whether the mobile device is to perform handover of the current serving base station; and in a case that it is determined in the second judgment that the mobile device is to perform handover of the current serving base station, handing over the wireless communication device from the mobile device serving as the current serving base station of the wireless communication device to a destination serving base station at least based on the channel measurement result of the wireless communication device.

According to another aspect of the present disclosure, a method for wireless communications is provided. The method includes: performing channel measurement, in response to a channel measurement instruction from a current serving base station of a wireless communication device; and generating a message containing a channel measurement result, to be reported to the current serving base station.

According to other aspects of the present disclosure, there are further provided computer program codes and computer program products for implementing the methods above, and a computer readable storage medium having recorded thereon the computer program codes for implementing the methods described above.

With the electronic apparatus and the method according to the present disclosure, in a case that it is determined in the first judgment that the mobile device is to perform handover of the current serving base station, a channel measurement result of the wireless communication device served by the mobile device is acquired, so that the handover of the current serving base station of the wireless communication device and the handover of the current serving base station of the mobile device can be performed in a determined order.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

Figure 1:
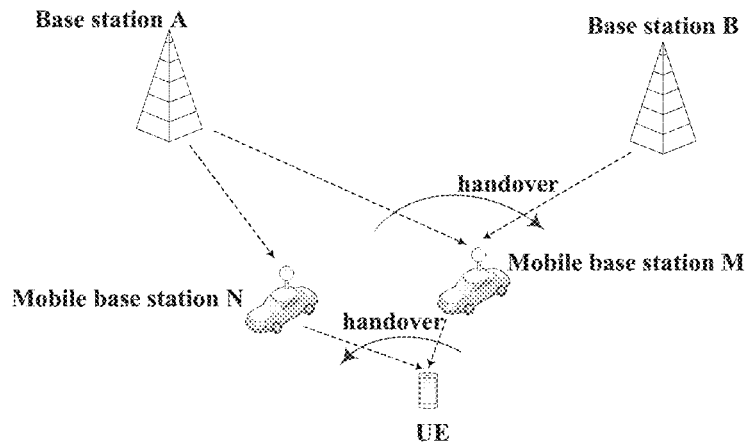
FIG. 1 is a schematic diagram showing a scenario of a handover of a current serving base station of a mobile device and handover of a current serving base station of a wireless communication device.

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

In the present disclosure, the mobile device is, for example, a device capable of providing wireless communication services and also having mobility itself, such as a mobile base station, a wireless relay device, a transmitting end device in device-to-device (D2D) communication or the like, which is used for expanding wireless communication coverage and increase the flexibility of communication system configuration. It is to be understood that a location of the mobile device may also remain unchanged. On the other hand, the mobile device also accesses into its current serving base station, such as a macro base station, and the mobile device may be handed over to another serving base station (hereinafter referred to as a destination serving base station) if a handover condition is met. The mobile device provides service for the wireless communication device, and the mobile device to which the wireless communication device is connected or accessed operates as a current serving base station of the wireless communication device, and the mobile device may be handed over to another mobile device or macro base station (which is also referred to as the destination serving base station) if the handover condition is met. The wireless communication device may be user equipment or terminal device of any kind such as a mobile terminal, an intelligent vehicle, or an intelligent wearable device, which has cellular communication capabilities. Alternatively, the wireless communication device may also be an infrastructure such as a small cell base station being capable of performing wireless communication with a macro base station. In addition, the wireless communication device may also be directly connected to a serving base station of the mobile device, for example, a macro base station, for communication. Hereinafter, description is made mainly by taking a mobile base station as an example of a mobile device, and user equipment (UE) as an example of a wireless communication device. However, it is to be understood that this is only for convenience of description and is not restrictive.

FIG. 1 is a schematic diagram showing a scenario of handover of a current serving base station of a mobile device and handover of a current serving base station of a wireless communication device. Mobile base stations N and M are mobile devices, and UE is a wireless communication device. In a current state, the mobile base station M accesses into a base station (such as a macro base station) A, and the UE accesses into the mobile base station M. Due to mobility of the devices, the UE would be handed over from the mobile base station M to the mobile base station N, and the mobile base station M would be handed over from the base station A to the base station B.

As described above, in the case that the two kinds of handover occur simultaneously, the order is uncertain. In other words, there are the following two situations: the UE performs the handover first, that is, the UE is handed over from the current mobile base station M to the mobile base station N, and then the mobile base station M performs the handover, that is, the mobile base station M is handed over from the base station A to the base station B; or the current mobile base station M performs the handover first, that is, the mobile base station M is handed over from the base station A to the base station B, and then the UE served by the mobile base station M performs the handover. This uncertainty of order may affect the communication quality of the UE.

Figure 2:
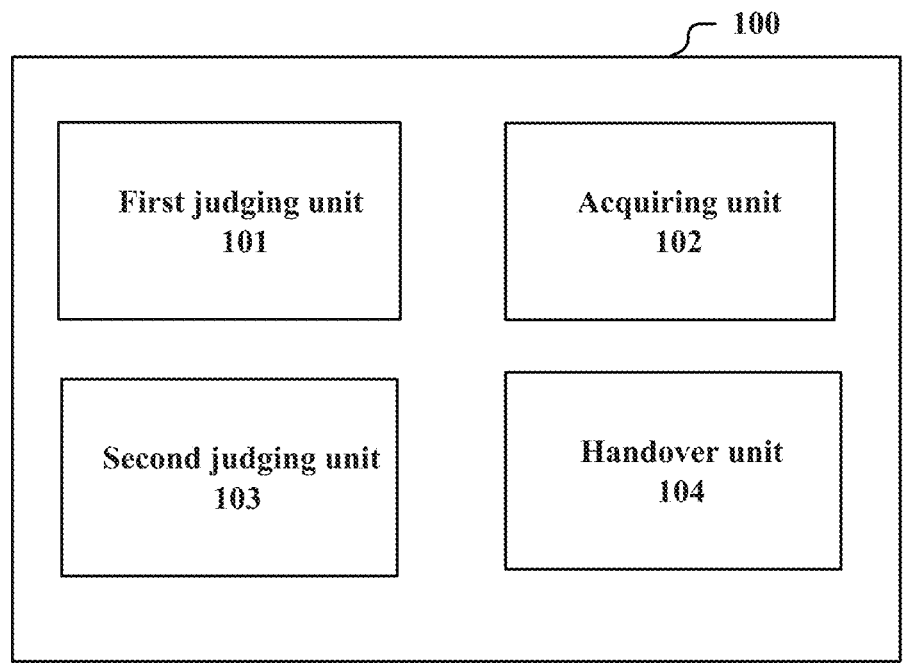
FIG. 2 is a block diagram showing functional modules of an electronic apparatus for wireless communications according to an embodiment of the present disclosure.

An electronic apparatus 100 for wireless communications is provided according to an embodiment, to allow the order of performing the above two kinds of handover to be determinate. FIG. 2 is a block diagram showing functional modules of the electronic apparatus 100 according to the embodiment. As shown in FIG. 2, the electronic apparatus 100 includes a first judging unit 101, an acquiring unit 102, a second judging unit 103, and a handover unit 104. The first judging unit 101 is configured to perform a first judgment as to whether a mobile device is to perform handover of a current serving base station of the mobile device. The acquiring unit 102 is configured to acquire, in a case that it is determined in the first judgment that the mobile device is to perform handover of the current serving base station, a channel measurement result of a wireless communication device connected to the mobile device. The second judging unit 103 is configured to perform a second judgment as to whether the mobile device is to perform handover of the current serving base station. The handover unit 104 is configured to, in a case that it is determined in the second judgment that the mobile device is to perform handover of the current serving base station, hand over the wireless communication device from the mobile device serving as a current serving base station of the wireless communication device to a destination serving base station at least based on the channel measurement result of the wireless communication device.

The first judging unit 101, the acquiring unit 102, the second judging unit 103 and the handover unit 104 may be implemented by for example one or more processing circuitries, which may be implemented as for example a chip.

In an example, the first judging unit 101 and the second judging unit 103 respectively perform the first judgment and the second judgment based on a channel measurement result of the mobile device. Taking the scenario of FIG. 1 as an example, the electronic apparatus 100 is located, for example, at the mobile base station side or communicatively connected to the mobile base station side. The mobile base station M performs channel measurement to obtain the channel measurement result, so that the first judging unit 101 and the second judging unit 103 of the electronic apparatus 100 respectively perform the first judgment and the second judgment based on the channel measurement result.

For example, the channel measurement result may include at least one of the following: Reference Signal Receiving Power (RSRP), Received Signal Strength Indicator (RSSI), and Reference Signal Receiving Quality (RSRQ). However, the channel measurement result is not limited thereto, and the channel measurement result may be any indicator capable of indicating the channel quality, for example, the channel measurement result may also be a signal to noise ratio or the like.

A condition of the second judgment used by the second judging unit 103 may be set to be stricter than a condition of the first judgment used by the first judging unit 101. For example, the condition of the second judgment is more difficult to be met than the condition of the first judgment. For example, in the first judgment, in a case that the channel quality of the channel between the mobile device and the current serving base station is lower than the channel quality of the channel between the mobile device and the destination serving base station by a first threshold, it is determined to perform handover of the current serving base station. In the second judgment, in a case that the channel quality of the channel between the mobile device and the current serving base station is lower than the channel quality of the channel between the mobile device and the destination serving base station by a second threshold, it is determined to perform handover of the current serving base station. The first threshold is smaller than or equal to the second threshold. In other words, compared with the difference between the quality of service capable of being provided by the current serving base station and the quality of service capable of being provided by the destination serving base station in the first judgment, the difference between the quality of service capable of being provided by the current serving base station and the quality of service capable of being provided by the destination serving base station in the second judgment is further increased. The first threshold and the second threshold are set based on factors such as a cell radius, a transmission power, the electromagnetic wave propagation environment, and a signal to interference and noise ratio requirement, and may be determined by the operator according to factors such as experience or preference.

Referring to the scenario shown in FIG. 1, in a case that the first judging unit 101 determines that the first threshold is broken through, meaning that the communication quality of the current channel is notably degraded, the mobile base station M should be prepared to hand over to another serving base station, for example, the destination serving base station B, to continue the communication. In this case, the acquiring unit 102 acquires a channel measurement result of the UE connected to the mobile base station M. The channel measurement result of the UE may include a measurement result of a channel between the UE and each of mobile base stations which may also include a macro base station).

Figure 3:
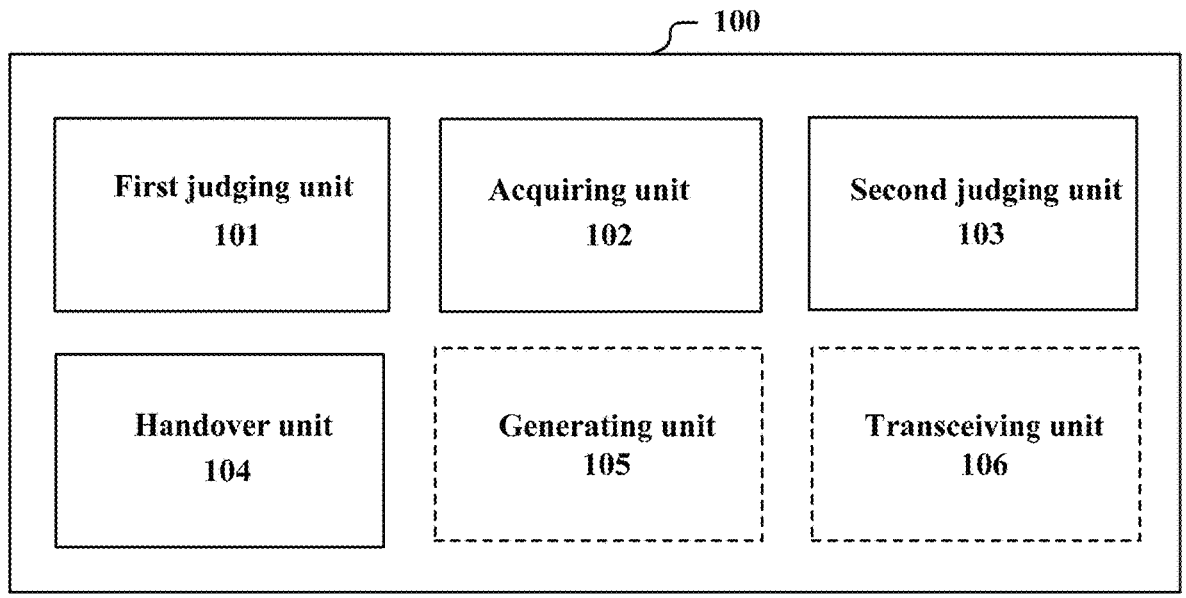
FIG. 3 is a block diagram showing functional modules of an electronic apparatus for wireless communications according to an embodiment of the present disclosure.

In addition, as shown by a dashed line block in FIG. 3, the electronic apparatus 100 may further include a generating unit 105, configured to generate an instruction for instructing the wireless communication device to report the channel measurement result. The generating unit 105 may be implemented by one or more processing circuitries, which may be implemented as for example a chip. The wireless communication device, for example, the UE in FIG. 1, may report the channel measurement result once in response to the instruction, or may report the channel measurement result for multiple times. In a case that the wireless communication device reports the channel measurement result for multiple times, the instruction generated by the generating unit 105 may further include an indicator which indicates the wireless communication device is to periodically report the channel measurement result and/or a period for reporting the channel measurement result.

Specifically, the instruction may include only an indicator for periodic reporting, and the wireless communication device performs reporting in a predetermined period after receiving the indicator. Alternatively, the instruction may include only the period for reporting, and the wireless communication device performs reporting at the period in the case of detecting the period, otherwise performs the reporting only once. Alternatively, the instruction may include both the indicator for periodic reporting and the period for reporting. The reliability of the channel measurement result may be further improved by performing periodic reporting. In addition, the instruction may also be a message including the measurement result of the mobile device.

Accordingly, as shown by another dashed line block in FIG. 3, the electronic apparatus 100 may further include a transceiving unit 106, configured to transmit the above instruction to the wireless communication device, and receive the channel measurement result from the wireless communication device. The transceiving unit 106, for example, may be implemented as a communication interface, which may be implemented, for example, as a chip.

In addition, the generating unit 105 is further configured to generate, in a case that it is determined in the second judgment that the mobile device is to perform handover of the current serving base station, an instruction for reporting a channel measurement result of the mobile device to the current serving base station of the mobile device. The transceiving unit 106 is further configured to transmit the channel measurement result of the mobile device to the current serving base station of the mobile device, and receive the instruction regarding the handover from the current serving base station. Accordingly, the handover unit 104 is configured to perform handover of the current serving base station of the mobile device based on the instruction from the current serving base station.

In summary, the electronic apparatus 100 acquires the channel measurement result of the wireless communication device connected to the mobile device through the acquiring unit 103, so that the handover of the current serving base station of the wireless communication device may be performed at any time. In other words, the electronic apparatus 100 may perform the handover of the current serving base station of the mobile device and the handover of the current serving base station of the wireless communication device served by the mobile base station in a determined order.

In an example, in a case that it is determined in the second judgment that the mobile device is to perform handover of the current serving base station, the handover unit 104 performs the handover of the current serving base station of the wireless communication device based on the channel measurement result of the wireless communication device, and then performs the handover of the current serving base station of the mobile device.

Figure 4:
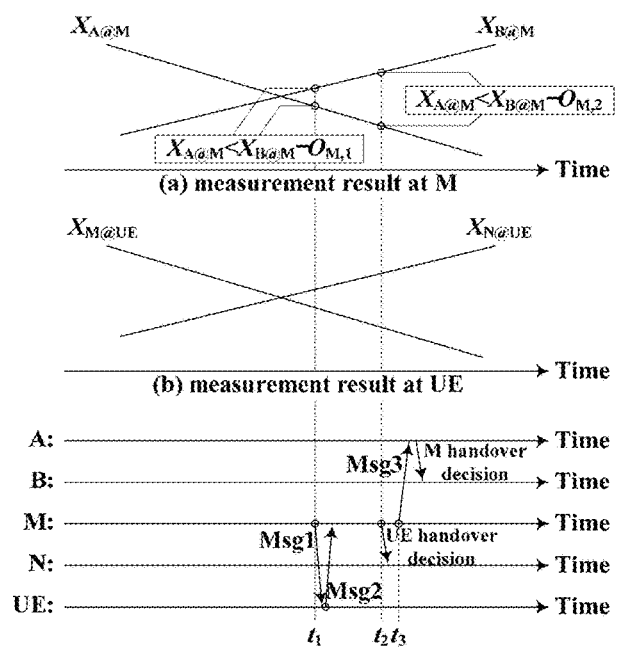
FIG. 4 is a schematic diagram showing a timing sequence with which the wireless communication device is handed over first and then the mobile device is handed over in the scenario of FIG. 1.

Still taking the scenario of FIG. 1 as an example, FIG. 4 is a schematic diagram showing a timing sequence with which the wireless communication device is handed over first and then the mobile device is handed over. As shown in FIG. 4, $t_1$ and $t_2$ represent time points at which the first judging unit 101 and the second judging unit 103 respectively perform judgment as to whether the mobile base station M is to perform handover of the current serving base station, and $X_{A@M} < X_{B@M} - O_{M,1}$, indicates that the condition of the first judgment is met, where $X_{A@M}$ indicates a channel measurement result of a channel between the base station A and the mobile base station M, $X_{B@M}$ indicates a channel measurement result of a channel between the base station B and the mobile base station M, and $O_{M,1}$ is the first threshold. Similarly, $X_{A@M} < X_{B@M} - O_{M,2}$ represents a condition of the second judgment is met, where $O_{M,2}$ indicates the second threshold, and $O_{M,1} \leq O_{M,2}$. Further, $X_{M@UE}$ and $X_{N@UE}$ respectively represent a channel measurement result of a channel between the mobile base station M and the UE as well as a channel measurement result of a channel between the mobile base station N and the UE.

At the time point $t_1$, the first judging unit 101 determines that the mobile base station M is to perform the handover of the current serving base station. Therefore, the mobile base station M transmits an instruction Msg1 for reporting the channel measurement result to the UE, and the UE immediately reports its channel measurement result, that is, the Msg2 in FIG. 4. Then, at the time point $t_2$, the second judging unit 103 determines that the second threshold is broken through, that is, it is further determined that the mobile base station M is to perform the handover of the current serving base station. The mobile base station M schedules the UE to be handed over to the mobile base station N based on the reported measurement result of the UE. Then, the mobile base station M transmits a message containing its measurement result, that is, the Msg3 in FIG. 4, to the base station A. The base station A schedules the mobile base station M to be handed over to the base station B at the time point $t_3$ based on the measurement result in the Msg3.

Figure 5:
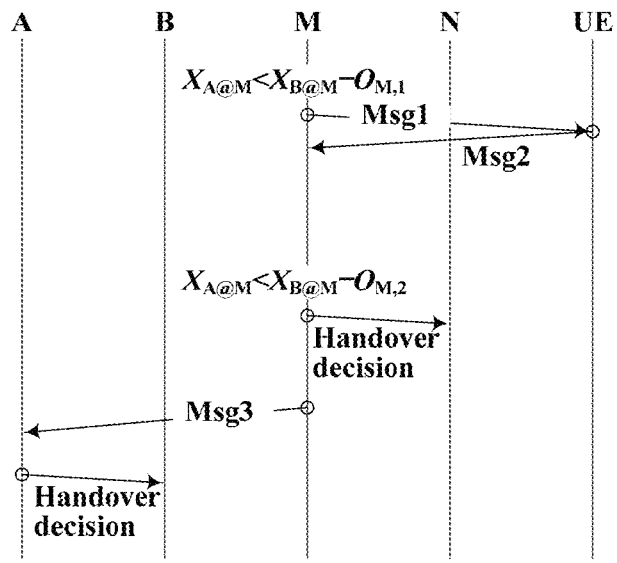
FIG. 5 is a schematic diagram showing an information procedure for the handover in FIG. 4.

FIG. 5 is a schematic diagram showing an information procedure of the handover in FIG. 4, the specific content of which is described in the description of FIG. 4, and is not repeated here.

Figure 6:
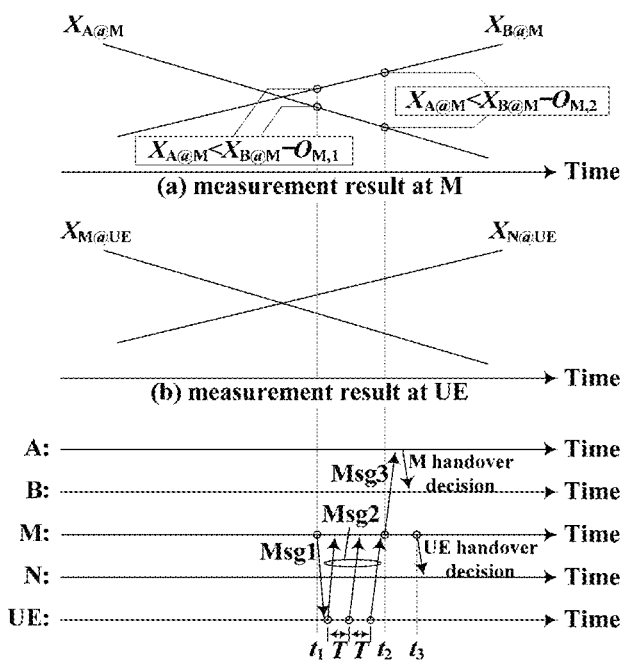
FIG. 6 is a schematic diagram showing another timing sequence with which the wireless communication device is handed over first and then the mobile device is handed over in the scenario of FIG. 1.
Figure 7:
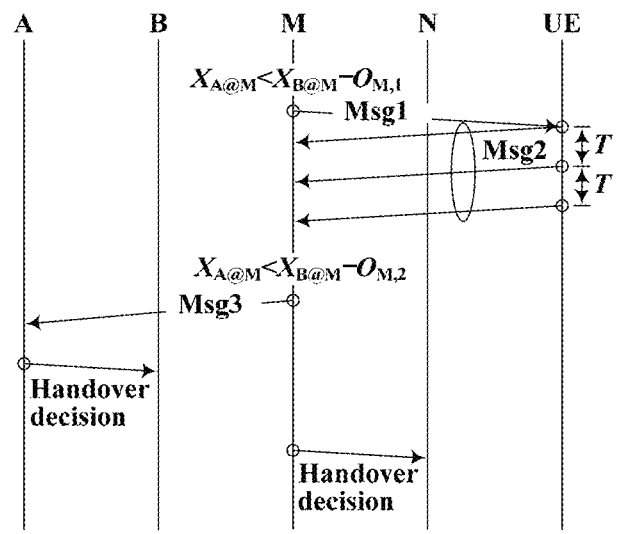
FIG. 7 is a schematic diagram showing an information procedure for the handover in FIG. 6.

In addition, FIG. 6 is a schematic diagram showing another timing sequence with which the wireless communication device is handed over first and then the mobile device is handed over. FIG. 6 is different from FIG. 4 in that the UE periodically reports the channel measurement result Msg2 at a period T after receiving the Msg1. The mobile base station M may perform handover of the serving base station of the UE, for example, based on all channel measurement results, thereby improving accuracy. FIG. 7 correspondingly shows a schematic diagram of the information procedure for the handover in FIG. 6, and FIG. 7 differs from FIG. 5 in that the Msg2 is repeatedly transmitted at the period T. The other parts of FIGS. 6 and 7 are described in the description of FIG. 4, which will not be repeated here.

In another example, in a case that it is determined in the second judgment that the mobile device is to perform handover of the current serving base station, the handover unit 104 performs the handover of the current serving base station of the mobile device, and then performs the handover of the current serving base station of the wireless communication device based on the channel measurement result of the wireless communication device.

Figure 8:
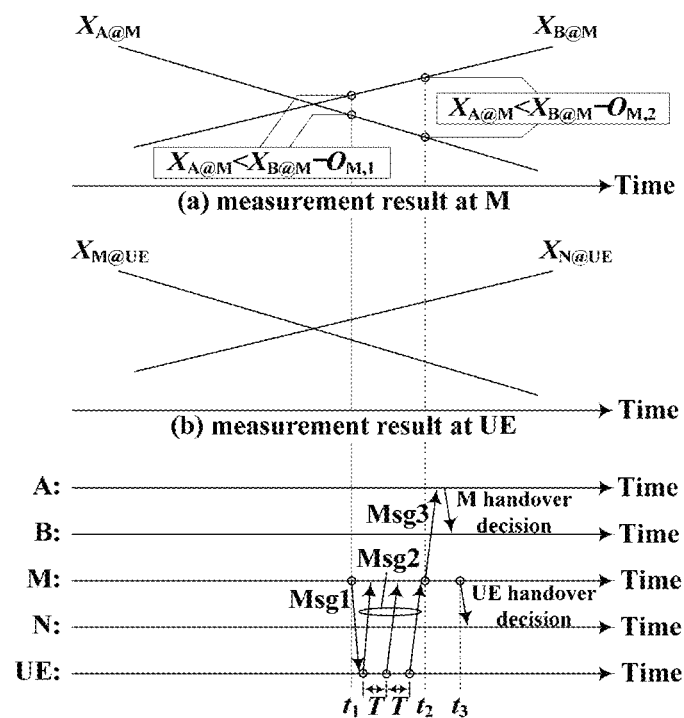
FIG. 8 is a schematic diagram showing an timing sequence with which the mobile device is handed over first and then the wireless communication device is handed over in the scenario of FIG. 1.
Figure 9:
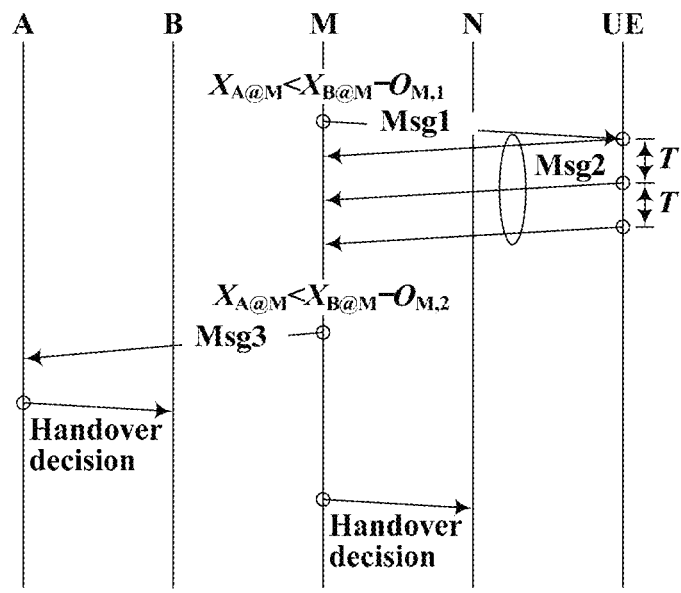
FIG. 9 is a schematic diagram showing an information procedure for the handover in FIG. 8.

Still taking the scenario of FIG. 1 as an example, FIG. 8 is a schematic diagram showing another timing sequence with which the mobile device is handed over first and then the wireless communication device is handed over. FIG. 9 is a schematic diagram showing an information procedure of the handover in FIG. 8. The same reference numerals in FIGS. 8 and 9 represent the same meanings as those in FIGS. 4 and 5, which will not be explained repeatedly here.

As shown in FIG. 8, at the time point $t_1$, the first judging unit 101 determines that the mobile base station M is to perform the handover of the current serving base station. Therefore, the mobile base station M transmits an instruction Msg1 to the UE for reporting the channel measurement result, and the UE immediately reports its channel measurement result, that is, the Msg2 in FIG. 8. The channel measurement result may be reported once or be reported for multiple times periodically. FIG. 8 shows a case of periodically reporting the channel measurement result at the period T, however, it is to be understood that the Msg2 may transmitted only once, for example, the first piece of Msg2.

Subsequently, at the time point $t_2$, the second judging unit 103 determines that the second threshold is broken through, that is, it is further determined that the mobile base station M is to perform the handover of the current serving base station, and the mobile base station M transmits a message containing its measurement result to the base station A, that is, the Msg3 in FIG. 8. The base station A schedules the mobile base station M to be handed over to the base station B based on the measurement result in the Msg3. Subsequently, the mobile base station M schedules the UE to be handed over to the mobile base station N at the time point $t_3$ based on the reported measurement result of the UE.

The specific content of the information procedure of the handover shown in FIG. 9 is described in the description of FIG. 8, and will not be repeated here.

It is to be noted that although the above description illustrates an example in which the serving base station of the wireless communication device is handed over to another mobile base station, this is not restrictive, and the handover unit 104 may also hand over the serving base station of the wireless communication device to a fixed base station, for example, a macro base station.

In summary, the electronic apparatus 100 according to the embodiment acquires, in a case that it is determined in the first judgment that the mobile device is to perform handover of the current serving base station, the channel measurement result of the wireless communication device served by the mobile base station, so that the handover of the current serving base station of the wireless communication device and the handover of the current serving base station of the mobile device can be performed in a determined order, thereby ensuring the communication quality.

Second Embodiment

Figure 10:
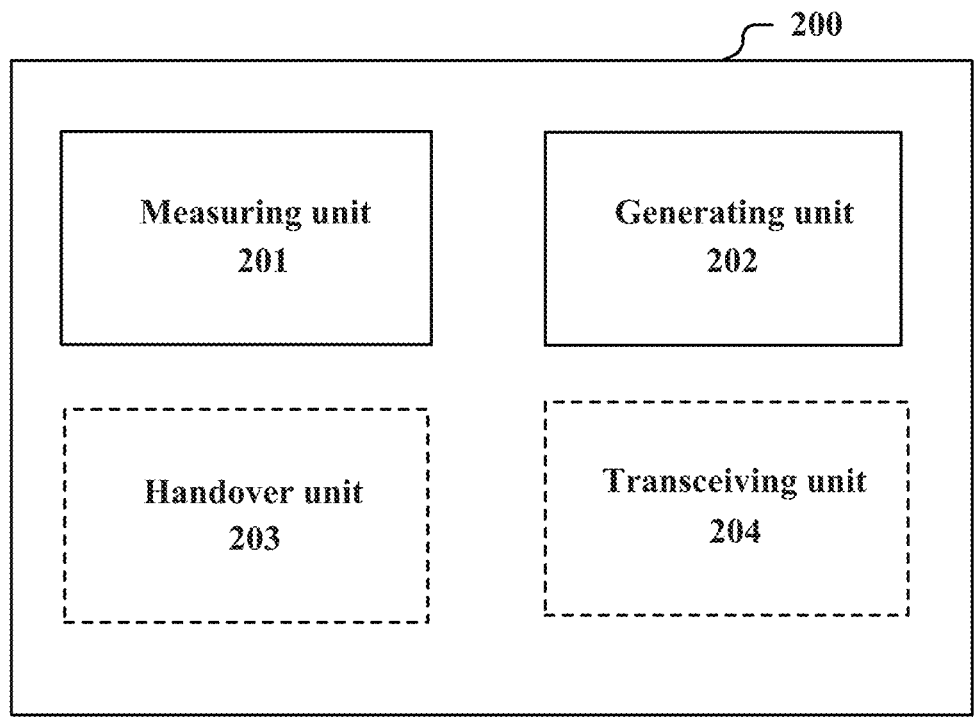
FIG. 10 is a block diagram showing functional modules of an electronic apparatus for wireless communications according to another embodiment of the present disclosure.

FIG. 10 is a block diagram showing functional modules of an electronic apparatus 200 for wireless communications according to another embodiment of the present disclosure. As shown in FIG. 10, the electronic apparatus 200 includes a measuring unit 201 and a generating unit 202. The measuring unit 201 is configured to perform channel measurement in response to a channel measurement instruction from a current serving base station of a wireless communication device. The generating unit 202 is configured to generate a message containing a channel measurement result to be reported to the current serving base station.

The measuring unit 201 and the generating unit 202 may be implemented, for example, by one or more processing circuitries, which may be implemented, for example, as a chip. Taking the scenario of FIG. 1 as an example, the electronic apparatus 200 may be located, for example, in the UE or communicatively connected to the UE.

The channel measurement performed by the measuring unit 201 may include, for example, measurement of at least one of RSRP, RSSI, and RSRO. More generally, the measured object is capable of reflecting the channel quality of a corresponding channel.

In an example, the measuring unit 201 may periodically perform channel measurement based on the channel measurement instruction. Accordingly, the generating unit 202 periodically generates the message containing the channel measurement result to be reported to the current serving base station. In this way, the serving base station may obtain more reliable channel measurement result, thereby performing more accurate handover.

As shown by the dashed line block in FIG. 10, the electronic apparatus 200 may further include a transceiving unit 204, configured to receive the channel measurement instruction from the current serving base station and transmit the message to the current serving base station. The transceiving unit 204 may be, for example, implemented as a communication interface, which may be implemented, for example, as a chip.

As shown by the dashed line block in FIG. 10, the electronic apparatus 200 may further include a handover unit 203, configured to perform handover from the current serving base station to a destination serving base station in a manner of handover determined by the current serving base station based on the message. For example, it may be handed over to another mobile device or a fixed base station.

The electronic apparatus 200 according to the embodiment reports the channel measurement result in response to the channel measurement quality of the current serving base station, so that the current serving base station can perform the handover of the current serving base station itself and the handover of the current serving base station of the wireless communication device based on the channel measurement result in a determined order, thereby effectively ensuring the communication quality.

Third Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the method described below may be executed by a computer-executable program completely, although the hardware and/or firmware of the electronic apparatus for wireless communications can also be used in the methods.

Figure 11:
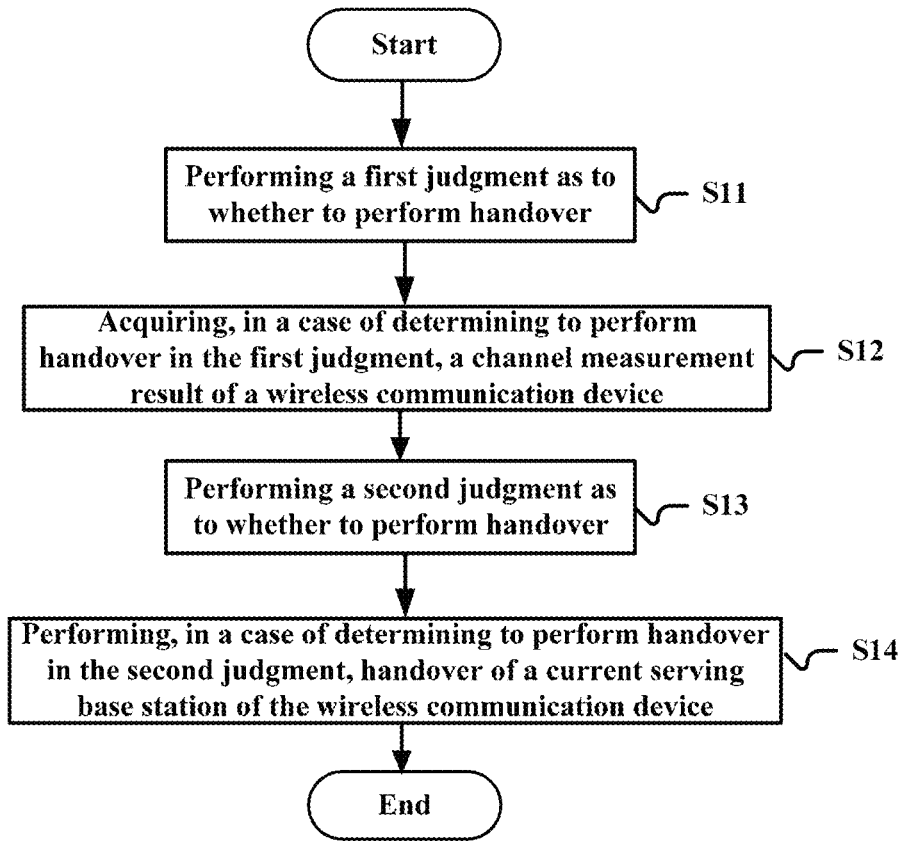
FIG. 11 is a flowchart showing a method for wireless communications according to an embodiment of the present disclosure.

FIG. 11 is a flowchart of a method for wireless communications according to an embodiment of the present disclosure. The method includes the steps of: performing a first judgment as to whether a mobile device is to perform handover of a current serving base station of the mobile device (S11); acquiring, in a case that it is determined in the first judgment that the mobile device is to perform handover of the current serving base station, a channel measurement result of a wireless communication device connected to the mobile device (S12); performing a second judgment as to whether the mobile device is to perform handover of the current serving base station (S13); and in a case that it is determined in the second judgment that the mobile device is to perform handover of the current serving base station, handing over the wireless communication device from the mobile device serving as the current serving base station of the wireless communication device to a destination serving base station at least based on the channel measurement result of the wireless communication device (S14).

The channel measurement result may include, for example, at least one of the following: Reference Signal Receiving Power (RSRP), Received Signal Strength Indicator (RSSI), and Reference Signal Receiving Quality (RSRQ).

For example, in steps S11 and S13, the first judgment and the second judgment may be performed based on the channel measurement result of the mobile device. The condition of the second judgment may be set to be stricter than the condition of the first judgment.

In step S11, in a case that the channel quality of the channel between the mobile device and the current serving base station is lower than the channel quality of the channel between the mobile device and the destination serving base station by a first threshold, it is determined to perform handover of the current serving base station. In step S13, in a case that the channel quality of the channel between the mobile base station and the current serving base station is lower than the channel quality of the channel between the mobile device and the destination serving base station by the second threshold, it is determined to perform handover of the current serving base station. The first threshold is smaller than or equal to the second threshold.

Figure 12:
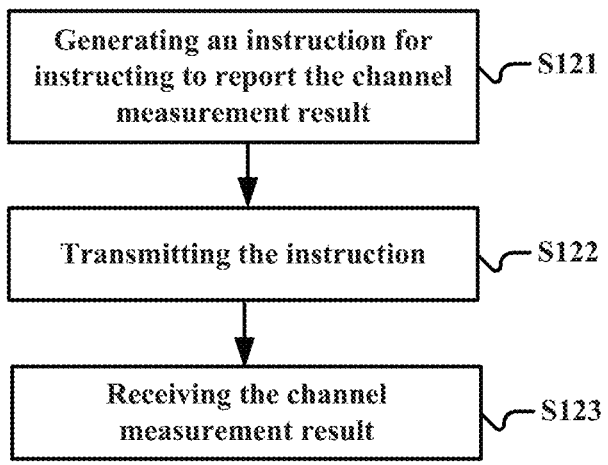
FIG. 12 is a flowchart of sub-steps of step S12 in FIG. 11.

As shown in FIG. 12, step S12 may include the following sub-steps: generating an instruction for instructing the wireless communication device to report the channel measurement result (S121); transmitting the instruction to the wireless communication device (S122), and receiving a channel measurement result from the wireless communication device (S123). In an example, the instruction may include an indicator which indicates the wireless communication device is to periodically report the channel measurement result and/or a period for reporting the channel measurement result.

In an example, in a case that it is determined in the second judgment that the mobile device is to perform handover of the current serving base station, in step S14, the handover of the current serving base station of the wireless communication device is performed based on the channel measurement result of the wireless communication device, and then the handover of the current serving base station of the mobile device is performed.

In another example, in the case that it is determined in the second judgment that the mobile device is to perform handover of the current serving base station, in step S14, the handover of the current serving base station of the mobile base station is performed, and then the handover of the current serving base station of the wireless communication device is performed based on the channel measurement result of the wireless communication device. The current serving base station of the wireless communication device may be handed over to a fixed base station.

For example, in the case that it is determined in the second judgment that the mobile device is to perform handover of the current serving base station, in step S14, an instruction for reporting the channel measurement result of the mobile device to the current serving base station of the mobile device may be generated, and the handover of the current serving base station of the mobile device may be performed based on the instruction from the current serving base station.

Figure 13:
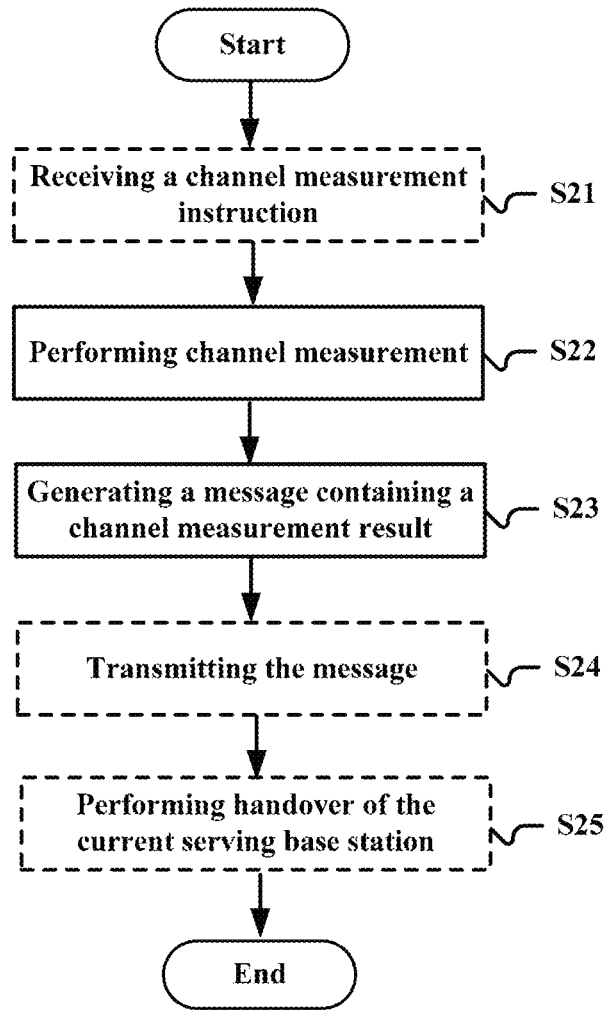
FIG. 13 is a flowchart showing a method for wireless communications according to another embodiment of the present disclosure.

FIG. 13 is a flowchart of a method for wireless communications according to another embodiment of the present disclosure. The method includes the following steps: performing channel measurement in response to a channel measurement instruction from a current serving base station of a wireless communication device (S22); and generating a message containing a channel measurement result, to be reported to the current serving base station (S23).

In step S22, channel measurement may be performed periodically based on the channel measurement instruction, and in step S23, the message containing the channel measurement result is periodically generated to be reported to the current serving base station. The channel measurement result may include, for example, at least one of the following: Reference Signal Receiving Power (RSRP), Received Signal Strength Indicator (RSSI), and Reference Signal Receiving Quality (RSRQ).

As shown by the dashed line block in FIG. 13, the above method may further include the following steps: receiving the channel measurement instruction from the current serving base station (S21); and transmitting the message to the current serving base station (S24). The current serving base station determines a handover manner based on the message. The above method further includes a step S25 of performing the handover of the current serving base station in the manner of handover determined by the current serving base station based on the message.

It should be noted that, the above methods can be performed separately or in combination with each other, and the details thereof are described in the first to the second embodiments, which are not repeatedly described herein.

Application Example

Figure 14:
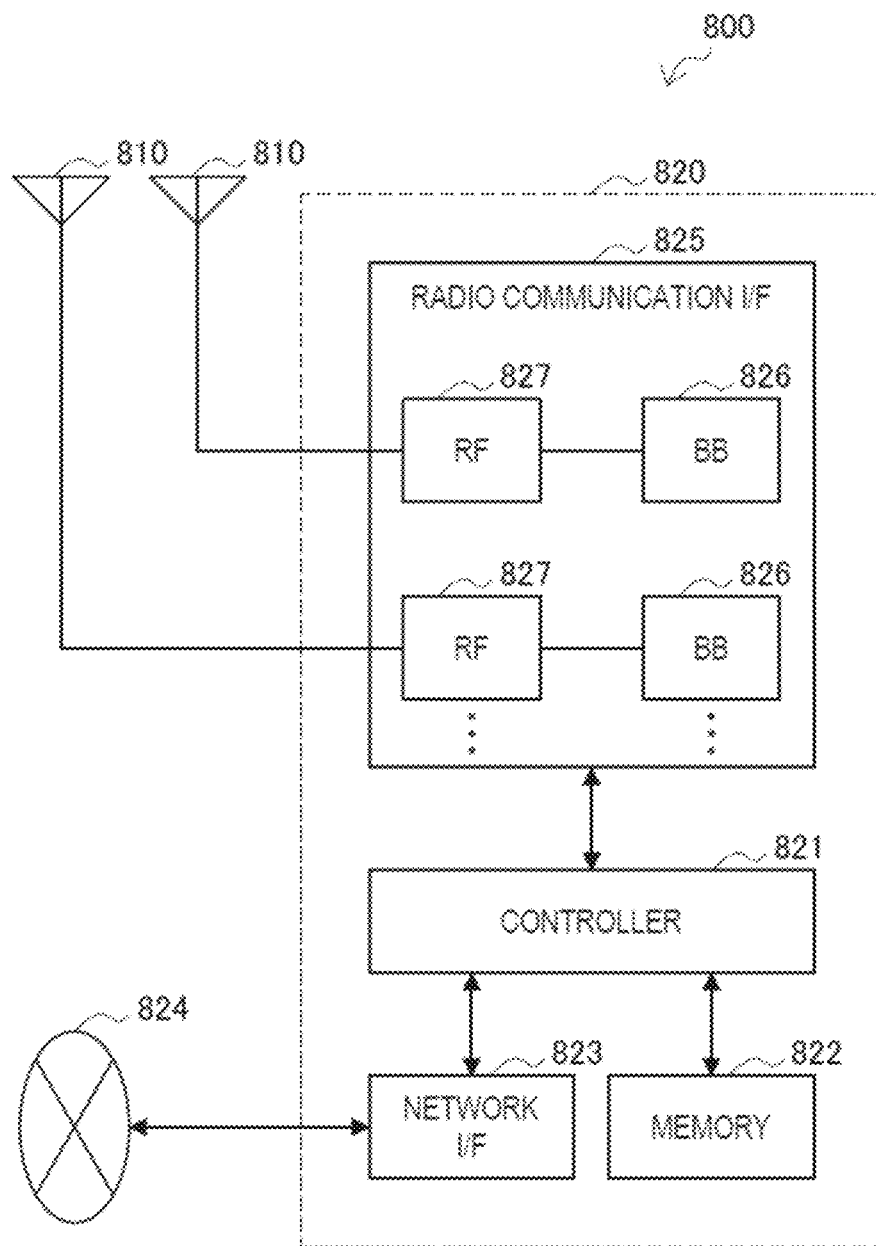
FIG. 14 is a block diagram showing a first example of a schematic configuration of an eNB to which the technology of the present disclosure may be applied.

The technology of the present disclosure may be applied to various products. The base station described above may be implemented as any type of evolved node B (eNB), such as a macro eNB and a small eNB. The small eNB may be an eNB such as a pico eNB, a micro eNB, and a home (femto) eNB that covers a cell smaller than a macro cell. Instead, the base station may be realized as any other types of base stations such as a NodeB and a base transceiver station (BTS). The base station may include a main body (that is also referred to as a base station apparatus) configured to control radio communication, and one or more remote radio heads (RRH) disposed in a different place from the main body. In addition, various types of user equipments, which will be described below, may each operate as the base station by temporarily or semi-persistently executing a base station function Application Example Regarding Base Station First Application Example FIG. 14 is a block diagram illustrating a first example of a schematic configuration of an eNB to which the technology of the present disclosure may be applied. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 14, the eNB 800 may include the multiple antennas 810. For example, the multiple antennas 810 may be compatible with multiple frequency bands used by the eNB 800. Although FIG. 14 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 14, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 14. For example, the multiple RF circuits 827 may be compatible with multiple antenna elements. Although FIG. 14 shows the example in which the radio communication interface 825 includes the multiple BB processors 826 and the multiple RF circuits 827, the radio communication interface 825 may also include a single BB processor 826 and a single RF circuit 827.

In the eNB 800 illustrated in FIG. 14, the transceiving unit 106 described with reference to FIG. 3 may be implemented by the radio communication interface 825. At least a part of the functions may also be implemented by the controller 821. For example, the controller 821 may perform handover of the current serving base station of the mobile device and handover of the current serving base station of the wireless communication device in a determined order by performing functions of the first judging unit 101, the acquiring unit 102, the second judging unit 103, the handover unit 104, and the generating unit 105.

Second Application Example

Figure 15:
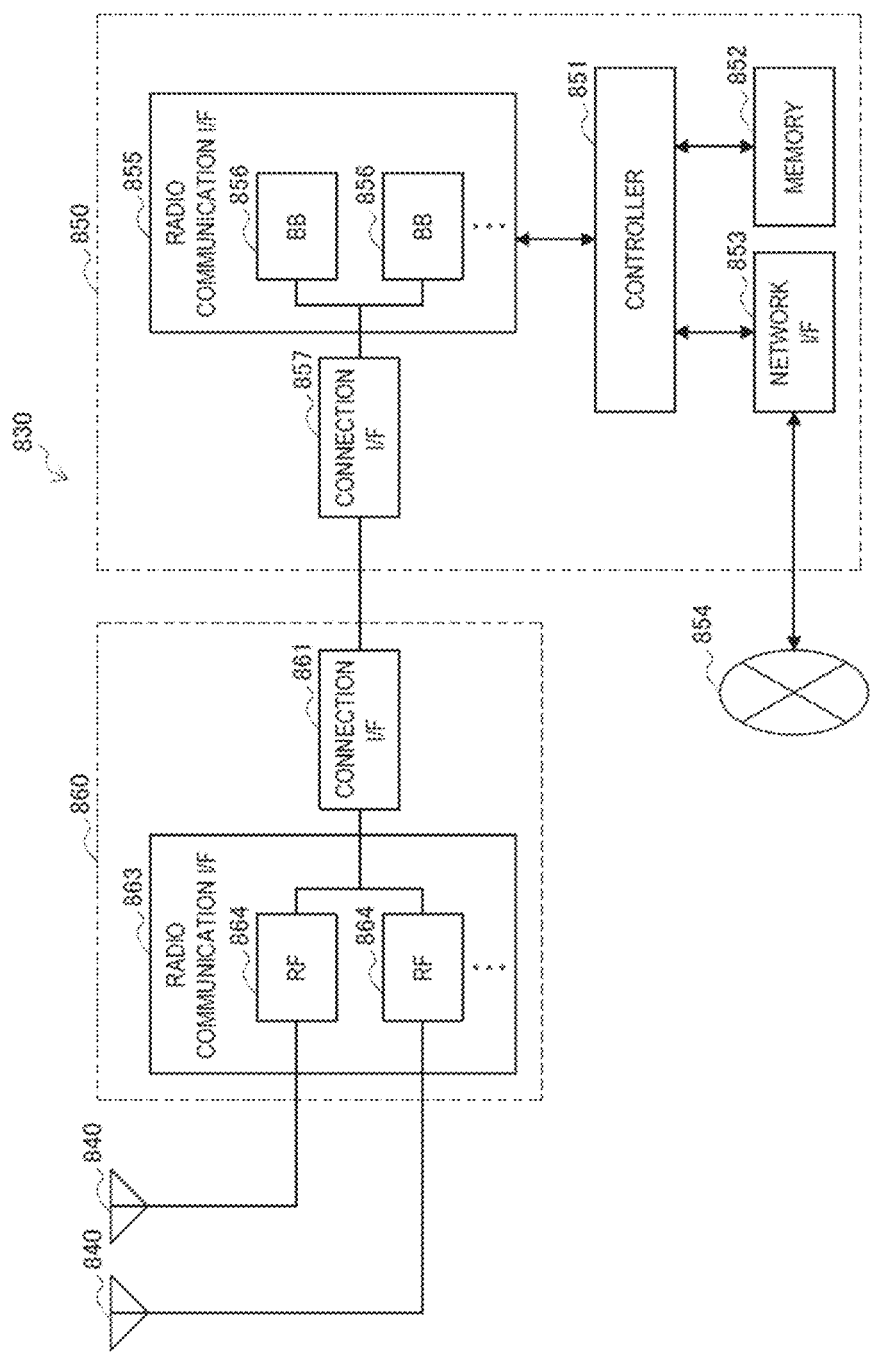
FIG. 15 is a block diagram showing a second example of a schematic configuration of an eNB to which the technology of the present disclosure may be applied.

FIG. 15 is a block diagram illustrating a second example of a schematic configuration of an eNB to which the technology according to the present disclosure may be applied. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 15, the eNB 830 may include the multiple antennas 840. For example, the multiple antennas 840 may be compatible with multiple frequency bands used by the eNB 830. Although FIG. 15 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 15.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 15, except that the BB processor 856 is connected to an RF circuit 864 of the RRH 860 via the connection interface 857. As show in FIG. 15, the radio communication interface 855 may include the multiple BB processors 856. For example, the multiple BB processors 856 may be compatible with multiple frequency bands used by the eNB 830. Although FIG. 15 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860, The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 15. For example, the multiple RF circuits 864 may support multiple antenna elements. Although FIG. 15 shows the example in which the radio communication interface 863 includes the multiple RF circuits 864, the radio communication interface 863 may also include a single RF circuit 864.

In the eNB 830 illustrated in FIG. 15, the transceiving unit 106 described with reference to FIG. 3 may be implemented by the radio communication interface 855 and/or the radio communication interface 863. At least a part of the functions may also be implemented by the controller 851. For example, the controller 851 may perform handover of the current serving base station of the mobile device and handover of the current serving base station of the wireless communication device in a determined order by performing functions of the first judging unit 101, the acquiring unit 102, the second judging unit 103, the handover unit 104, and the generating unit 105

Application Examples Regarding User Equipment

For example, the user equipment may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The user equipment may also be realized as a terminal (that is also referred to as a machine type communication (MTC) terminal) that performs machine-to-machine (M2M) communication. Furthermore, the user equipment may be a radio communication module (such as an integrated circuit module including a single die) mounted on each of the terminals.

First Application Example

Figure 16:
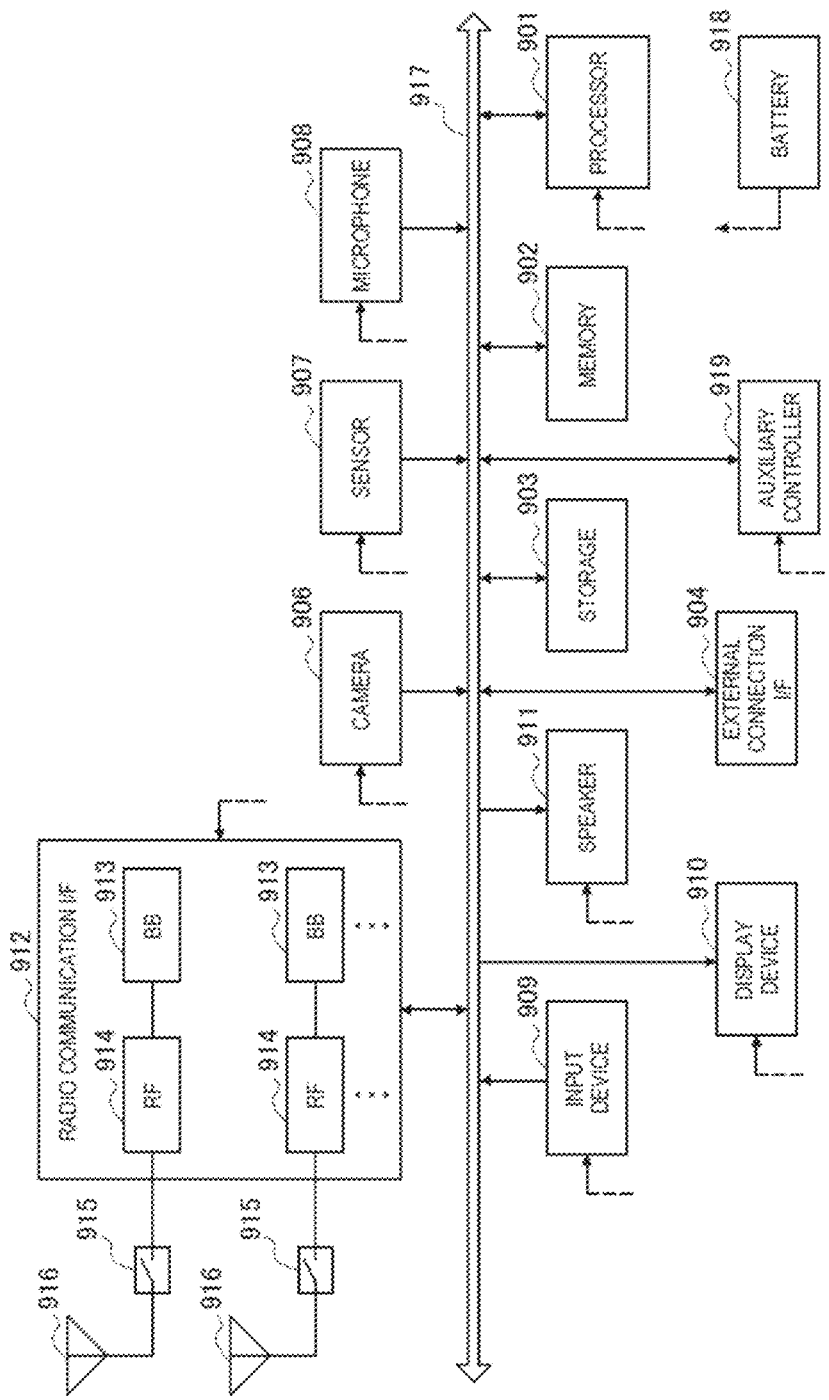
FIG. 16 is a block diagram showing an example of a schematic configuration of a smartphone to which the technology according to the present disclosure may be applied.

FIG. 16 is a block diagram illustrating an example of exemplary configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LIT-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. The radio communication interface 912 may be a chip module having the BB processor 913 and the RF circuit 914 integrated thereon. The radio communication interface 912 may include multiple BB processors 913 and multiple RF circuits 914, as shown in FIG. 16. Although FIG. 16 shows the example in which the radio communication interface 912 includes the multiple BB processors 913 and the multiple RE circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 16. Although FIG. 16 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 16 via feeder lines that are partially shown as dashed lines in FIG. 16. The auxiliary controller 919, operates a minimum necessary function of the smart phone 900, for example, in a sleep mode.

In the smartphone 900 shown in FIG. 16, the transceiving unit 204 described with reference to FIG. 10 may be implemented by the radio communication interface 912. At least a part of functions may be implemented by a processor 901 or an auxiliary controller 919. For example, the processor 901 or the auxiliary controller 919 may report the channel measurement result in response to the instruction of the current serving base station by performing the functions of the measuring unit 201 and the generating unit 202, and may perform the handover of the current serving base station by performing the function of the handover unit 203.

Second Application Example

Figure 17:
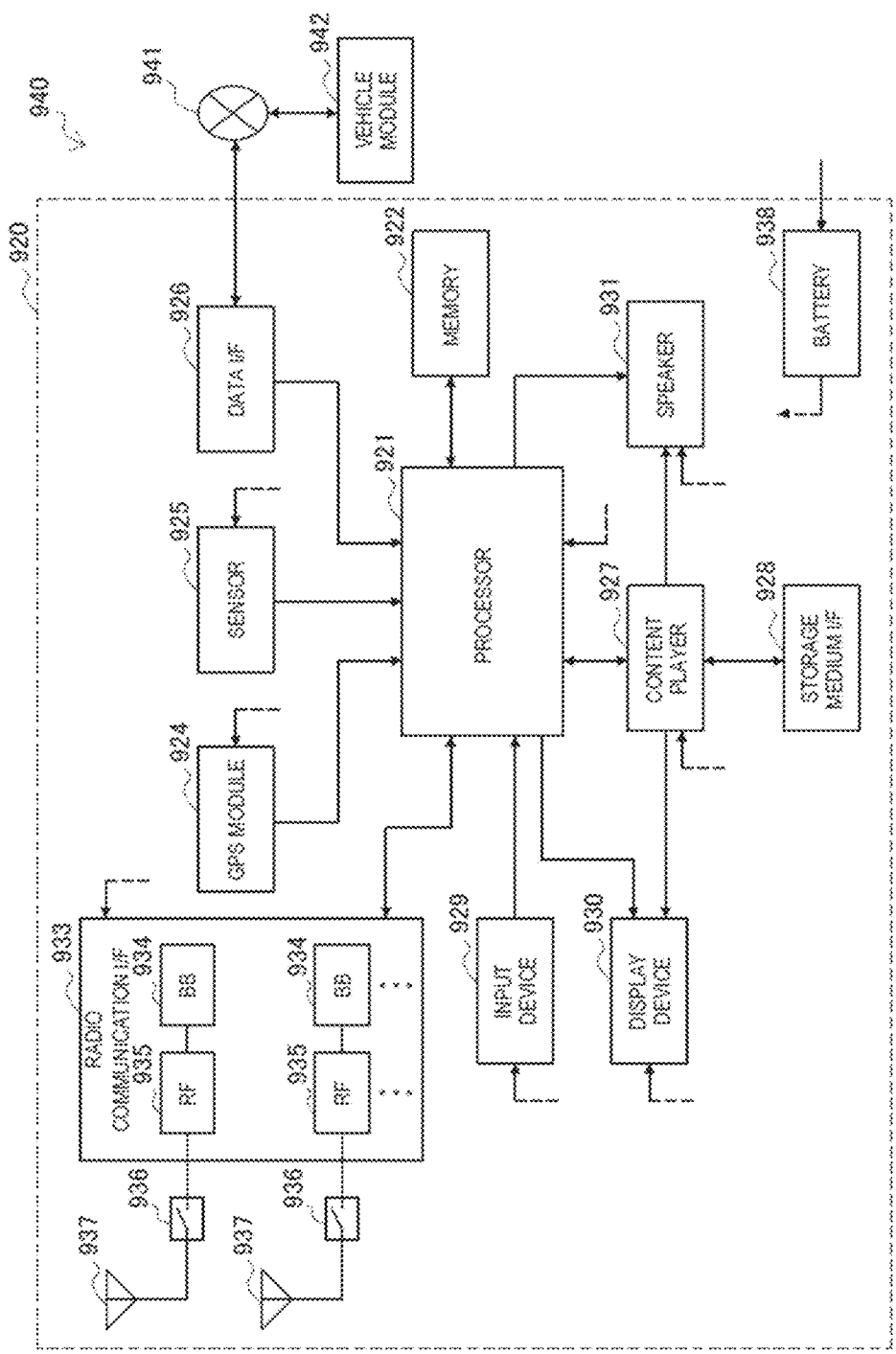
FIG. 17 is a block diagram showing an example of a schematic configuration of a car navigation device to which the technology of the present disclosure may be applied.

FIG. 17 is a block diagram showing an example of a schematic configuration of a car navigation device 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 17. Although FIG. 17 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 17, the car navigation apparatus 920 may include the multiple antennas 937. Although FIG. 17 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 17 via feeder lines that are partially shown as dash lines in FIG. 17. The battery 938 accumulates power supplied from the vehicle.

In the car navigation device 920 shown in FIG. 17, the transceiving unit 204 described with reference to FIG. 10 may be implemented by the radio communication interface 933. At least a part of functions may be implemented by the processor 921. For example, the processor 921 may report the channel measurement result in response to the instruction of the current serving base station by performing the functions of the measuring unit 201 and the generating unit 202, and may perform the handover of the current serving base station by performing the function of the handover unit 203.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1800 shown in FIG. 18) from a storage medium or network, wherein the computer is capable of implementing various functions when installed with various programs.

Figure 18:
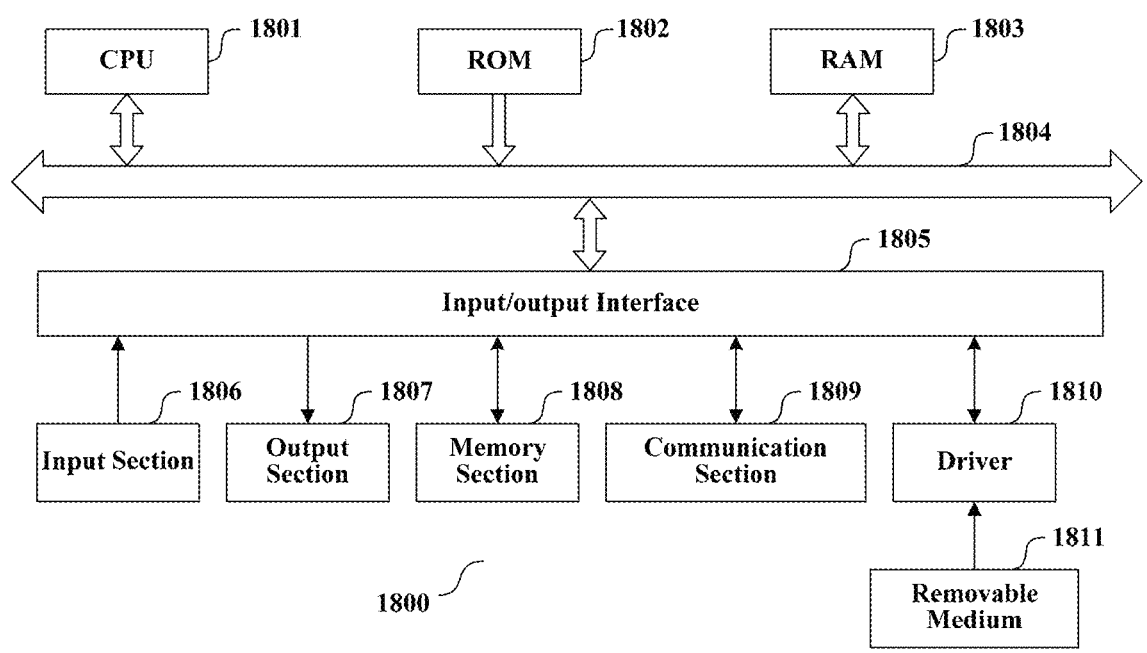
FIG. 18 is a block diagram of an exemplary block diagram illustrating the structure of a general purpose personal computer capable of realizing the method and/or device and/or system according to the embodiments of the present disclosure.

In FIG. 18, a central processing unit (CPU) 1801 executes various processing according to a program stored in a read-only memory (ROM) 1802 or a program loaded in a random access memory (RAM) 1803 from a memory section 1808. The data needed for the various processing of the CPU 1801 may be stored in the RAM 1803 as needed. The CPU 1801, the ROM 1802 and the RAM 1803 are linked with each other via a bus 1804. An input/output interface 1805 is also linked to the bus 1804.

The following components are linked to the input/output interface 1805: an input section 1806 (including keyboard, mouse and the like), an output section 1807 (including displays such as a cathode ray tube (CRT), a liquid crystal display (LCD), a loudspeaker and the like), a memory section 1808 (including hard disc and the like), and a communication section 1809 (including a network interface card such as a LAN card, modem and the like). The communication section 1809 performs communication processing via a network such as the Internet. A driver 1810 may also be linked to the input/output interface 1805, if needed. If needed, a removable medium 1811, for example, a magnetic disc, an optical disc, a magnetic optical disc, a semiconductor memory and the like, may be installed in the driver 1810, so that the computer program read therefrom is installed in the memory section 1808 as appropriate.

In the case where the foregoing series of processing is achieved through software, programs forming the software are installed from a network such as the Internet or a memory medium such as the removable medium 1811.

It should be appreciated by those skilled in the art that the memory medium is not limited to the removable medium 1811 shown in FIG. 18, which has program stored therein and is distributed separately from the apparatus so as to provide the programs to users. The removable medium 1811 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1802 and the memory section 1808 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. A mobile device for wireless communications, comprising:
   transceiver circuitry; and
   processing circuitry, configured to:
   determine that a value of a first channel quality measurement of a channel between the mobile device and a current serving base station is lower than a value of a first channel quality of a channel between the mobile device and a destination serving base station minus a first threshold;
   based on the determination, acquire a channel measurement result of a wireless communication device connected to the mobile device;
   after acquiring the channel measurement result, determine whether or not a value of a second channel quality measurement of the channel between the mobile device and the current serving base station is lower than a value of a second channel quality of the channel between the mobile device and the destination serving base station minus a second threshold larger than the first threshold;
   in a case that the value of the second channel quality measurement of the channel between the mobile device and the current serving base station is lower than the value of the second channel quality of the channel between the mobile device and the destination serving base station by the second threshold, transmit a measurement message to the current serving base station;
   in response to the measurement message, receive a handover instruction message from the current serving base station; and
   perform a handover of the wireless communications device from the current serving base station to the destination serving base station based on handover instruction message,
   wherein the mobile device is a mobile base station, a serving base station of the mobile device is a macro base station, and a serving base station of the wireless communication device is the mobile base station or the macro base station.

2. The mobile device according to claim 1, wherein the processing circuitry is configured to generate an instruction for instructing the wireless communication device to report the channel measurement result.

3. The mobile device according to claim 2, wherein the instruction comprises an indicator which indicates the wireless communication device is to periodically report the channel measurement result and a period for reporting the channel measurement result.

4. The mobile device according to claim 1, wherein, based on the channel measurement result of the wireless communication device, the processing circuitry is configured to perform a handover of the wireless communication device to another mobile device at a time different from performing the handover of the mobile device to the destination serving base station.

5. The mobile device according to claim 4, wherein the destination serving base station is a fixed base station.

6. The mobile device according to claim 4, wherein the time different from performing the handover of the mobile device to the another mobile device is a time prior to performing the handover of the mobile device to the destination serving base station.

7. The mobile device according to claim 4, wherein the time different from performing the handover of the mobile device to the another mobile device is a time after performing the handover of the mobile device to the destination serving base station.

8. The mobile device according to claim 1, wherein each channel measurement result comprises at least one of the following: a Reference Signal Receiving Power, a Received Signal Strength Indicator, or a Reference Signal Receiving Quality.

9. A method for wireless communications, the method performed by a mobile device and comprising:
  determining that a value of a first channel quality measurement of a channel between the mobile device and a current serving base station is lower than a value of a first channel quality of a channel between the mobile device and a destination serving base station minus a first threshold;
  based on the determination, acquiring a channel measurement result of a wireless communication device connected to the mobile device;
  after acquiring the channel measurement result, determining whether or not a value of a second channel quality measurement of the channel between the mobile device and the current serving base station is lower than a value of a second channel quality of the channel between the mobile device and the destination serving base station minus a second threshold larger than the first threshold;
  in a case that the value of the second channel quality measurement of the channel between the mobile device and the current serving base station is lower than the value of the second channel quality of the channel between the mobile device and the destination serving base station by the second threshold, transmitting a measurement message to the current serving base station;
  in response to the measurement message, receiving a handover instruction message from the current serving base station; and
  performing a handover of the wireless communication device from the current serving base station to the destination serving base station based on handover instruction message,
  wherein the mobile device is a mobile base station, a serving base station of the mobile device is a macro base station, and a serving base station of the wireless communication device is the mobile base station or the macro base station.

10. The method according to claim 9, further comprising:
  based on the channel measurement result of the wireless communication device, performing a handover of the wireless communication device to another mobile device at a time different from performing the handover of the mobile device to the destination serving base station.

11. The method according to claim 10, wherein the time different from performing the handover of the mobile device to the another mobile device is a time prior to performing the handover of the mobile device to the destination serving base station.

12. The method according to claim 10, wherein the time different from performing the handover of the mobile device to the another mobile device is a time after performing the handover of the mobile device to the destination serving base station.

* * * * *